Sept. 29, 1964          G. L. TRANDEL          3,150,527

VARIABLE SPEED DEVICE AND ADJUSTING MEANS THEREFOR

Filed April 24, 1961          4 Sheets-Sheet 1

Inventor:
George L. Trandel
By: Hill & Hill
Attys.

Sept. 29, 1964 G. L. TRANDEL 3,150,527
VARIABLE SPEED DEVICE AND ADJUSTING MEANS THEREFOR
Filed April 24, 1961 4 Sheets-Sheet 3

Inventor:
George L. Trandel
By: Hill & Hill Attys.

Inventor:
George L. Trandel
By: Hill & Hill
Attys

United States Patent Office 3,150,527
Patented Sept. 29, 1964

3,150,527
VARIABLE SPEED DEVICE AND ADJUSTING
MEANS THEREFOR
George L. Trandel, Elgin, Ill., assignor to Gerbing
Manufacturing Company, Elgin, Ill., a corporation
of Illinois
Filed Apr. 24, 1961, Ser. No. 105,075
16 Claims. (Cl. 74—89)

The invention relates generally to control mechanisms and more particularly to a control or adjusting mechanism for variable speed devices and the like.

The invention is particularly adapted for use with, and is illustrated in the drawings in connection with variable speed pulleys.

Drives of the general type involved often times employ a drive mechanism which is constructed to connect driving and driven elements whereby a variable drive ratio between such elements may be achieved. In a common type of such drive structures, the variable speed drive and control mechanism is constructed as a unit to which is connected the power source, such as an electric motor, and the driven elements which may be in the form of a reduction gear assembly or unit, the latter or the power source usually forming the base and supporting means for the other parts of the device.

The present invention has among its objects the production of a control device in which the arrangement and disposition of the driving and driven elements as well as the position of the control mechanism may be arranged in any one of a plurality of combinations with the driving and driven elements being disposed above or below one another, alongside of one another or at opposite sides of the variable control mechanism and in which the latter may be suitably disposed for most convenient operation and actuation.

Another object of the invention is the production of a control device having belt driven variable pitch pulleys in which the belt may be readily inspected, and replacement of the belt may be easily accomplished by removal of several screws or the like which permits complete exposure of pulleys, as well as relieving the belt-tensioning forces on one pulley, whereby the belts may be readily removed and replaced, at the same time retaining the original setting of the adjustable control member.

Another object of the invention is the production of a control device which may be provided with means for indicating the relative position of adjustment of the structure, which structure is exceedingly simple in construction and foolproof, and may be readily set to the most convenient viewing position irrespective of the arrangement or disposition of the various components of the device.

A further object of the invention is the production of a control device having the above features which is exceedingly simple in construction, durable in use and relatively inexpensive to manufacture.

Many other objects and advantages of the construction herein shown and described will be obvious to those skilled in the art from the disclosure herein given.

In the drawings, wherein like reference characters indicate like or corresponding parts:

FIG. 7 is a sectional view taken approximately on the line 7—7 of FIG. 2;

FIG. 8 is a semi-diagrammatic view of an end elevation of the control device illustrating in dotted lines some of the possible arrangements which may be employed in positioning the components;

The present invention contemplates a control device, for example, connecting a power source such as an electric motor, and a reduction gearing or other power outlet device in which the housing of the control structure may be constructed in the form of two substantially identical halves which may house two variable pulleys, one being adjustably connected to the control structure for manual adjustment, and the other being spring biased to follow the adjustment of the first pulley. Adjustably mounted on the housing is a manually actuable control device which may be mounted in any desired relation with respect to the housing to conform to any particular disposition of the housing with respect to the power and driven elements with which it is associated.

*The Housing Structure*

Figure 1:
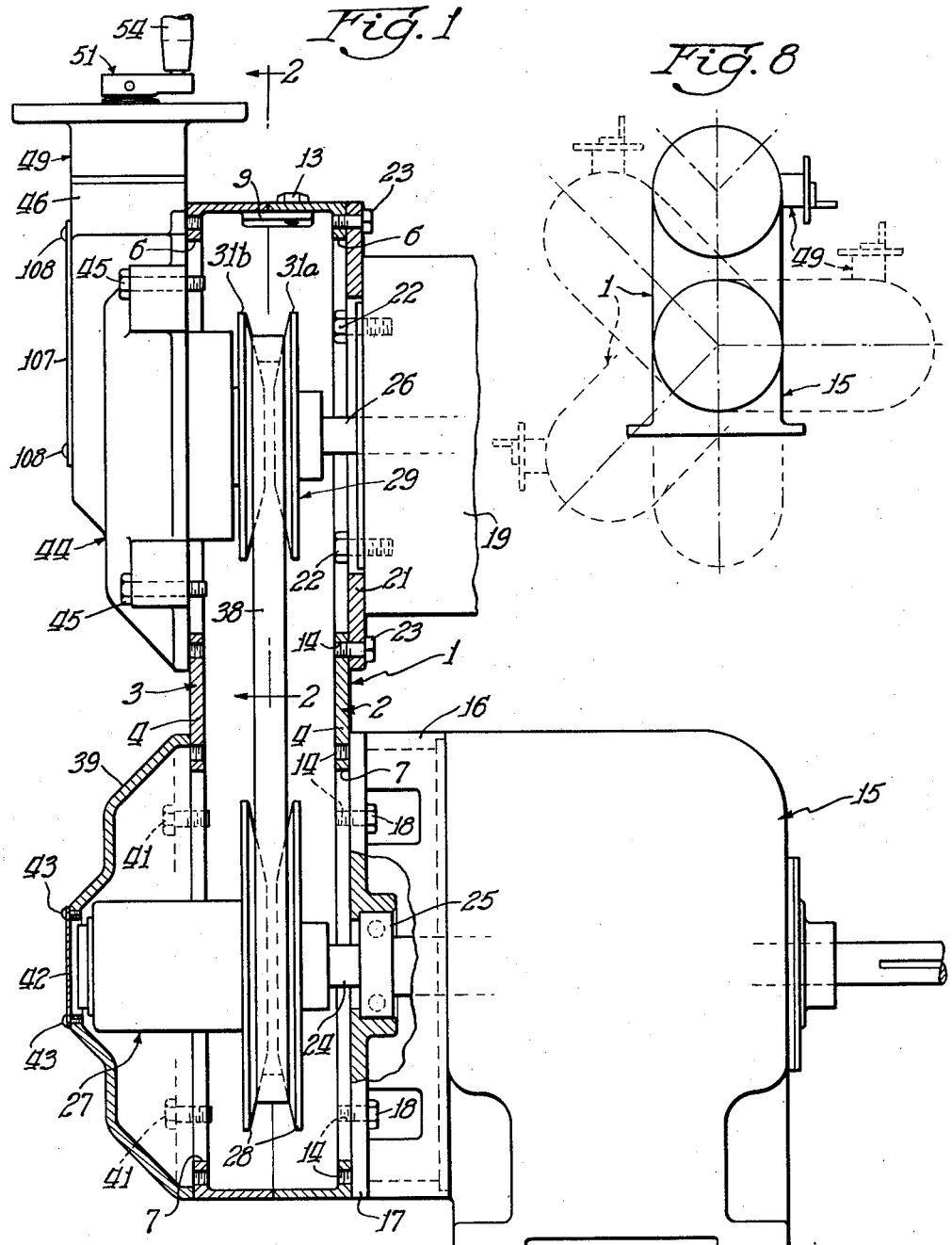
FIG. 1 is a side elevational view of a control device embodying the present invention, with portions of the housing structure broken away to show the general construction.
Figure 2:
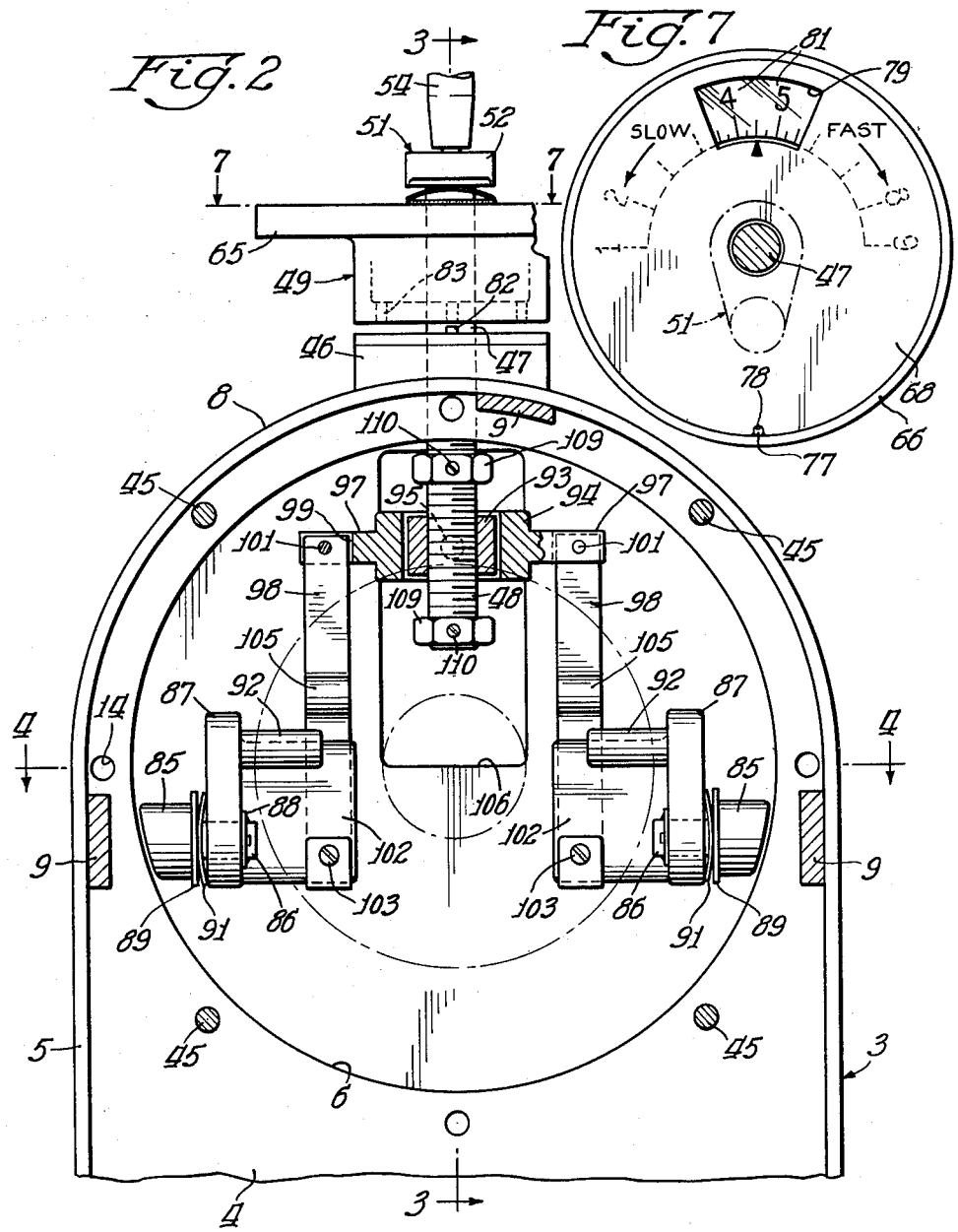
FIG. 2 is a sectional view through a portion of the control mechanism taken approximately on the line 2—2 of FIG. 1, with a pulley structure omitted.
Figure 3:
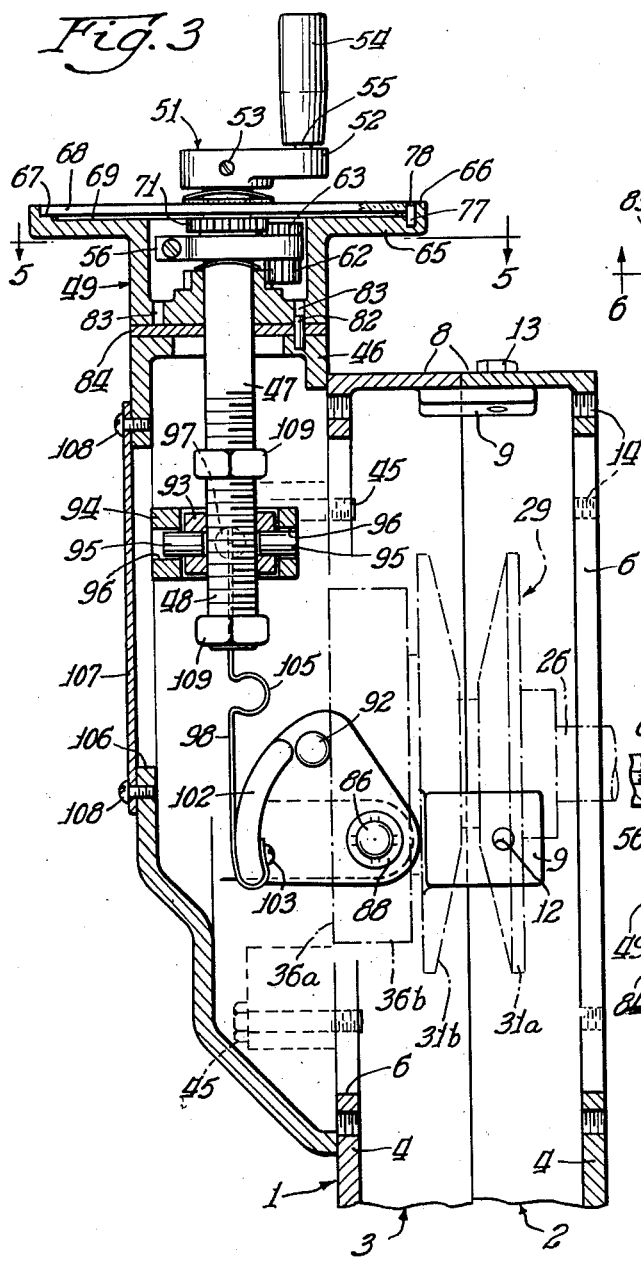
FIG. 3 is a sectional view through the control structure taken approximately on the line 3—3 of FIG. 2.
Figure 5:
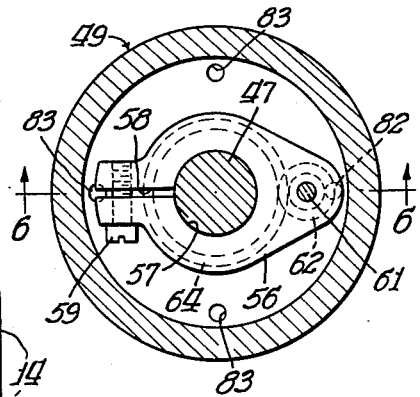
FIG. 5 is a sectional view taken approximately on the line 5—5 of FIG. 3.

Referring to the drawings and more particularly to FIGS. 1 through 3, the reference numeral 1 indicates generally a housing for the control mechanism comprising two sections 2 and 3 which are identical and merely reversed end for end.

Figure 9:
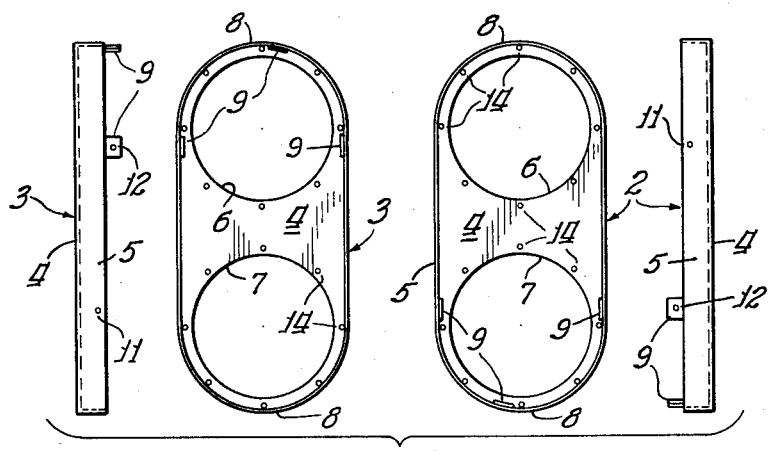
FIG. 9 is a composite figure of the two halves of the housing structure taken both in side elevation and plan, illustrating the relative positions of the respective elements of the two sections.

As more particularly illustrated in FIG. 9, each housing may comprise a wall 4 having a continuous edge wall 5 extending transversely thereto along its peripheral edges. As illustrated in FIG. 9, the walls 4 may be provided with a pair of circular openings 6 and 7 therein, adjacent end edges of the wall 4 and the end portion 8 of the edge walls 5 being concentrically shaped with respect to the adjacent portions of the openings 6 and 7. Each section is provided with three outwardly extending mounting lugs 9 which are shown as being welded or otherwise fastened to the inner face of the edge walls 5 at one end of the section. Thus the sections 2 and 3 as illustrated in FIG. 9 are identical with the sections being reversed end to end and positioned in opposed relation, so that when they are assembled, the flanges 9 of each section will be positioned adjacent the inner face of the edge wall 5 of the other section and such edge walls of each section may be provided with holes 11 adapted to be aligned with corresponding threaded holes 12 in the lugs 9, for connection by bolts 13 passing through the holes 11 and threaded into the holes 12. Each section is also provided with a plurality of holes 14 which are symmetrically disposed about the circular openings 6 and 7 and provide means for mounting the housing section to the various elements of the remaining structure.

As illustrated in FIG. 1, the housing section 2 may be suitably connected to a supporting structure, as for example, a reduction gear box indicated by the numeral 15 and having a connecting member indicated at 16, either formed as an integral part of the reduction housing, or as a separate element attached thereto and having a mounting flange 17 through which bolts 18 may pass and be threaded into the associated bores 14 in the housing section 2. In like manner, the power means such as a motor 19, only a portion of which is illustrated in FIG. 1, may be mounted on the upper end of the housing section 2 by suitable means such as an adapter ring 21, the motor 19 being secured to the latter by suitable means such as bolts 22 and the ring in turn being mounted to the housing by bolts 23.

Referring to FIG. 9, it will be noted that the housing sections are provided with a plurality of threaded holes 14, eight of which are disposed about each of the openings 6 and 7, with the housing section 2 being illustrated as attached to the reduction gear assembly 15 by four bolts 18, and the motor 19 connected through the ring 21 to the housing section 2 by four bolts 23. Consequently by selection of the proper threaded bores 14 for reception of the mounting bolts 18 and 23, the housing section may be disposed in any desired relation with respect to the gear assembly 15 and motor 19 in increments of forty-five degrees as diagrammatically illustrated in dotted lines in FIG. 8, so that the housing section may be disposed with its longitudinal axis extending either vertically, horizontally or diagonally. In like manner, the motor 19 may be similarly positioned with respect to the housing 1, although in most instances it will probably be immaterial as to the exact orientation of the motor with respect to the housing section other than as a convenience in location of the wiring connections to the motor.

*The Drive Mechanism*

The reduction gearing 15, which may be of any suitable form, is provided with a driven shaft 24 illustrated as being supported in a suitable bearing 25 and the motor 19 is provided with a drive shaft 26, the axes of the shafts 24 and 26 being concentric with the axes of the circular openings 6 and 7 respectively in the two housing sections. Mounted on the shaft 24 of the gear box is a variable pitch pulley indicated generally by the numeral 27 which may be of any suitable type and is adapted to be spring biased in its closed position of maximum pitch diameter. The particular construction of the pulley 27 forms no part of the present invention and any suitable type of variable pitch pulley may be employed, as for example, the type illustrated in Patent No. 2,714,313, issued on August 2, 1955, to Willard E. Gerbing.

Briefly, the pulley 27 is of a type having a pair of oppositely disposed pulley halves 28 which are axially movable relative to each other, whereby the two halves may be closely positioned adjacent one another or relatively widely separated. Thus, when separated, a belt disposed therebetween will tend to ride adjacent the axis of the pulley, whereas the belt will ride adjacent the periphery of the pulley halves when the latter are positioned adjacent one another. The pulley halves 28 are suitably biased by means, as for example, a compression spring and suitable cooperating elements, whereby the two halves 28 are urged into closed position whereby a belt riding therebetween will be engaging the pulley at its maximum pitch diameter, but upon sufficient tension on the belt, the two pulley halves may be separated whereby the belt is operatively connected to the pulley on a smaller pitch diameter.

Figure 4:
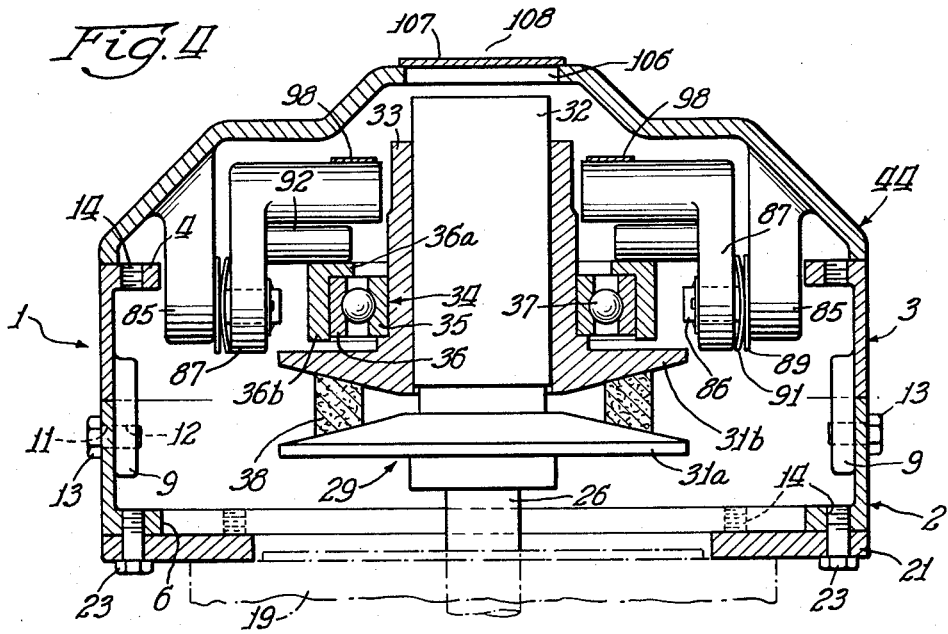
FIG. 4 is a sectional view taken approximately on the line 4—4 of FIG. 2.

Mounted on the shaft 26 is an adjustable pulley 29 having two pulley halves 31a and 31b which are likewise axially movable relative to one another, whereby the effective pitch diameter of the pulley 29 may also be varied. As illustrated in FIG. 4, the pulley half 31a is rigidly attached to the drive shaft 26 of the motor and may be provided with a cylindrical hub portion 32 on which is mounted the other pulley half 31b, the latter being provided with a tubular hub portion 33 slidable on the cylindrical portion 32. The pulley half 31a thus is stationary with respect to the shaft 26, while the half 31b is slidable toward and away from the half 31a. Movement of the half 31b may be accomplished by mechanical means, hereinafter described, which is illustrated as being operative through a suitable thrust bearing indicated generally by the numeral 34, having a thrust collar or cone 35 mounted on the pulley half 31b and a thrust collar or cone 36 operatively connected thereto through a plurality of ball bearings 37.

As will be apparent from a reference to FIG. 1, when the pulleys are connected by a suitable belt 38, the variable pulley 27 will follow the adjustment of the pulley 29 so that when the halves 31a and 31b of the pulley 29 are adjusted for minimum pitch diameter, the pulley 27 will be at maximum pitch diameter, and when the pulley halves 31a and 31b are moved to their position of maximum pitch diameter, the pulley 27 will be automatically adjusted to its minimum pitch diameter, an effective ratio between the shaft 24 and 26 being obtained on the order of 10:1.

The opening 7 in the housing section 3 may be closed by a suitable cover member 39 which is secured to the housing section by suitable bolts 41 threaded into the adjacent bores 14 of the section, and if desired the cover may be provided with a suitable inspection cap 42 which may be secured in place by suitable means such as screws 43.

The opening 6 in the section 3 is closed by a cover member indicated generally by the numeral 44 which also houses the control mechanism for adjusting the pulley 29 and indicating mechanism therefor, as well as providing the supporting structure for such control mechanism.

*The Indicia for Mechanism*

As illustrated in FIGS. 1 and 4, the member 44 is generally similar in shape to the cover member 39, and may be similarly secured to the housing by four bolts 45.

The member 44 is provided with a generally cylindrical projection or boss 46 which extends radially with respect to the axis of the shaft 26 and opening 6, in which is journaled a shaft 47, which extends vertically as viewed in FIGS. 2 and 3, the shaft being threaded at its lower end as indicated at 48.

Adjustably mounted on the boss 46 is an indicator housing, indicated generally by the numeral 49, the latter being rotatable relative to the boss 46. The shaft 47 is provided at its upper end with a crank handle 51, comprising a radially extending member 52 secured to the upper end of the shaft 47 by one or more set screws 53 provided with a transversely extending handle 54 which is rotatably mounted on a shaft 55 rigidly carried by the member 52.

The shaft 47 is also provided with a radially extending member 56 disposed within the member 49, the member 56 having a bore 57 through which the shaft 47 extends, and being bifurcated as indicated at 58 so that it may be clamped to the shaft 47 by means of a clamp screw 59 which extends through one of the bifurcated portions and is threaded into the opposite one.

Journaled in the member 56 is a short shaft 61 which carries at its lower end, as viewed in FIG. 3, a relatively small pinion 62 and at its upper end a relatively large pinion 63, the pinion 62 being adapted to mesh with a stationary gear 64 rigidly mounted in the member 49 which, if suitably designed, may be formed integrally therewith. The upper portion of the member 49 is provided with a circular shaped flange 65 formed with a peripheral rim 66 and having an annular shoulder 67 formed therein on which is seated a transparent disc 68 below which is positioned a dial card 69 which is rotatable beneath the disc 68 and is provided with a pinion 71 which is operatively meshed with the pinion 63, as clearly illustrated in FIGS. 3 and 6.

Figure 6:
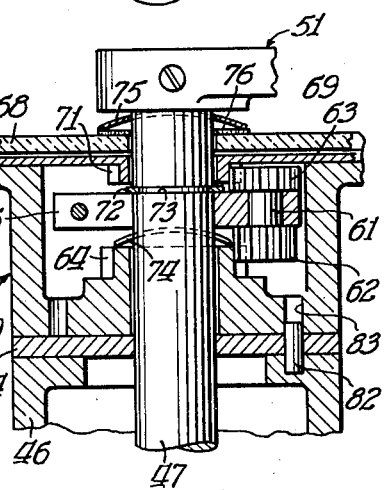
FIG. 6 is a sectional view taken approximately on the line 6—6 of FIG. 5.

Thus, as the shaft 47 is rotated, the rotation of the shaft 61 about the axis of the shaft 47 as the member 56 is rotated therewith will result in the rotation of the pinion 62 through its engagement with the stationary gear 64, causing rotation of the shaft 61 about its axis and in turn rotation of the pinion 63. Referring to FIG. 6, it will be noted that the pinion 63 is larger than the pinion 62 and thus the gear 64 is larger than the gear 71. Consequently, as the shaft 47 is rotated the gear ratios are such that the disc 69 will be rotated in the opposite direction to the rotation of the shaft 47, but at a very slow rate. Consequently, the gearing operates as a very high ratio reduction system so that the disc 69 will rotate only a small fraction of one revolution for every revolution of the shaft 47.

Axial movement of the member 56 toward the free end of the shaft 47 is prevented by a lock ring 72 disposed in a groove 73 in the shaft 47 and disposed between the member 56 and the gear 64. Likewise, disposed between the member 56 and gear 64 and between the disc 68 and the member 52 of the crank 51 are respective spring washers 74 and 75, a suitable flat washer of felt or other suitable material 76 being disposed between the spring washer 75 and the disc 68. As illustrated in FIGS. 3 and 7, the disc 68 may be prevented from rotating relative to the member 49 by a pin 77 carried by the portion 65 of the member 49 and extending into a slot 78 in the edge of the disc, the latter, if desired, being suitably painted of colored on the rear face to render the same opaque, leaving a small window 79 through which indicia 81 on the disc 69 are visible.

Rotation of the member 49 relative to the boss 46 is prevented by a pin 82 rigidly carried by the boss 46 and adapted to seat in any one of a plurality of radially disposed bores 83 formed in the adjacent portion of the member 49. Thus by raising the member 49 sufficiently to disengage the pin 82 therefrom, the member 49 may be rotated relative to the boss 46 and locked in position by engagement of the pin with any one of the remaining bores 83, the member 49 preferably seating on a suitable washer 84.

The Pulley Adjusting Mechanism

Extending inwardly from the member 39 is a pair of oppositely disposed, aligned projections or lugs 85 which respectively carry inwardly directed axially aligned studs or pins 86 on which are pivotally mounted actuating arms 87, the latter being retained on their respective pins 86 by suitable retaining washers 88 or equivalent means, a flat washer 89 and a spring washer 91 being disposed between each associated lug 85 and arm 87.

Extending inwardly in opposed relation is a pair of actuating pins 92, which as illustrated in FIGS. 3 and 4, are adapted to engage the annular flange 36a of the ring member 36b carried by the thrust collar 36 of the thrust bearing 34 so that as the arms 87 are rotated about the pins 86 the pulley half 31b will be moved toward or away from the cooperable pulley half 31a.

Such movement of the arms 87 is accomplished by rotation of the shaft 47 to which the arms are operatively connected.

Referring to FIGS. 2 and 3, carried by the threaded end 48 of the shaft 47 is a nut 93 which is operatively connected to a collar 94 by a pair of diametrically opposed pins 95 carried by the nut and pivotally carried in bores 96 in the collar 94. Extending radially outward from the collar 94 is a pair of diametrically opposed extensions 97, the axis of which is disposed at right angles to the axis of the pins 95. The actuating arms 87 are operatively connected to the extensions 97 of the collar 94 by suitable means such as strap members 98, the upper ends of which extend in diametrically extending slots 99 in the extensions 97, the straps being secured thereto by transversely extending pins 101, while the lower end of the straps 98 are secured to arcuate shaped inwardly extending portions 102 formed on the respective actuating or rocker arms 87. The lower ends of the straps 98 may be wrapped around the corresponding edge of the portions 102 and secured thereto by suitable means such as screws 103 threaded into the portion 102.

Thus as the shaft 47 is rotated, depending upon the direction of rotation thereof, the nut 93 will be moved upwardly or downwardly along the threaded portion 48 of the shaft, and will carry with it the collar 94, thereby imparting a rotational movement to the actuating or rocker arms 87 about the axis of their pins 86, such rotation being operable to move the pins 92 in a direction to urge the thrust bearing 34 along the axis of the shaft 26, thereby moving the pulley half 31b toward or away from its cooperable half 31a and permitting the belt to change its pitch relationship.

In operation the construction of the collar 94 and its connection with the nut 93 is operative to divide the forces acting on the strap 98 so that equal forces are applied through the members 87 and pins 92 to the thrust bearing 34.

As illustrated in FIGS. 2 and 3, the straps 98 each may be provided with a loop 105 therein which will act as a spring to cushion the actuating arms 87 and the pulley half 31b from the collar 94, nut 93 and shaft 47.

The member 44 may be provided with an elongated opening 106, adapted to be closed by a cover plate 107 secured to the member 44 by suitable means such as screws 108, the opening 106 providing access to the lower end of the shaft 47 and the straps 98, as well as providing means by which an examination of the belt 38 may be effected. The amount of travel of the nut 93 along the shaft 47 may be controlled by suitable limit nuts 109 which may be locked to the shaft 47 at any desired position by lock screws 110, or other suitable means, and the opening 106 thus provides access to the limit nuts, permitting adjustment thereof from the exterior without disassembly of the mechanism or the housing.

In use, the pulleys 27 and 29 are selected as to pitch diameters and range of adjustment to meet the desired requirements and the housing sections are suitably secured to the motor and reduction gear housing in the desired position, and the cover 44 is likewise adjusted with respect to the housing to position the indicating mechanism and crank 51 in the most convenient position for use. At the same time the limit nuts 109 may be properly adjusted and if necessary the indicating dial may be readily adjusted by merely removing the crank 51 and with it the washers 75 and 76 and disc 68, following which the disc 69 and gear 71 may be readily lifted up to disengage the latter from the pinion 63, following which the gear may be rotated to any desired position, the gear then being remeshed with the pinion, and the remaining elements reassembled in reverse order. If it is desired to merely change the position of the dial with respect to the member 44, this can be readily accomplished, as previously described, by moving the member 49 and with it the associated elements outwardly to raise the member from off of the pin 82, following which it may be rotated to the desired position and the pin 82 inserted in the corresponding bore 83.

It will be particularly noted that the condition of the belt may be readily ascertained through the opening 106 and in the event it is necessary to change the belt this may be readily and easily accomplished by merely removing the screws 13 which bolt the two housing sections 2 and 3 together, following which the section 3 may be readily removed, exposing both pulley halves.

It will be noted that with the removal of the sections, all of the pulley adjusting mechanism carried by the member 44 is also removed, following which the belt may be readily removed as the pulley half 31b may be readily removed to its outer or separated position from the half 31a to enable the belt to be slipped over the pulley 27. Following replacement of the belt, the two sections are reassembled and the screws 13 mounted to lock the sections in assembled relation.

It will be noted that the adjusting construction is such that a very fine adjustment may be secured with the components making up the adjusting mechanism being very durable and long lasting, and that it is unnecessary to disturb the adjustment when removing the section 3 or changing belts.

It will be noted that the construction offers a maximum of flexibility in assembly to permit the adjusting mechanism to be disposed at the most suitable location and providing a construction which permits the belt to be replaced in a very simple manner, the pulleys being completely exposed to eliminate any threading operations as is common in some types of drive.

Having thus described my invention, it will be obvious to those skilled in the art from the disclosure herein given that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A control mechanism for variable speed drive devices, comprising a controllable member movable along an axis, a pair of pivotal actuating members engageable with said controllable member and operable upon pivotal movement to axially move said controllable member, an externally threaded rotatable adjusting shaft, the axis of which extends in a direction transverse to the direction of the pivotal axes of said actuating members, a nut carried by the threaded portion of said adjusting shaft, a collar pivotally connected to said nut for pivotal movement about an axis extending parallel to the axis along which said controllable member is movable, a pair of strap members each connected at one end to a respective actuating member and at the other end to said collar, said strap members including resilient expansive means operatively positioned between the respective actuating member and said collar operatively connected to said strap members, said actuating members each having an arcuately shaped portion over which the strap may ride, means operatively connected to said shaft for adjustably rotating the same, a rotatable indicator element, and means operatively connecting said rotatable indicator element with said shaft.

2. A control mechanism for variable speed drive devices, comprising a controllable member movable along an axis, a pair of pivotal actuating members engageable with said controllable member and operable upon pivotal movement to axially move said controllable member, an externally threaded rotatable adjusting shaft, the axis of which extends in a direction transverse to the direction of the pivotal axes of said actuating members, a nut carried by the threaded portion of said adjusting shaft, a collar pivotally connected to said nut for pivotal movement about an axis extending parallel to the axis along which said controllable member is movable, a pair of strap members each connected at one end to a respective actuating member and at the other end to said collar, said strap members including resilient expansive means operatively positioned between the respective actuating member and said collar operatively connected to said strap members, said actuating members each having an arcuately shaped portion over which the strap may ride, means operatively connected to said shaft for adjustably rotating the same, a rotatable indicator element, means operatively connecting said rotatable indicator element with said shaft, said rotatable indicator element being carried by a gear element, a stationary gear element carried by a stationary part of the device, and a pair of rigidly connected pinions operatively carried by said shaft and rotatable on an axis extending in the same direction as the shaft axis, said pinions being engaged with and operatively connected to said gear elements.

3. A control mechanism for variable speed drive devices, comprising a movable controllable member, a pair of independently pivotal actuating members engageable with said controllable member and operable upon pivotal movement to move said controllable member, a rotatable adjusting shaft, the axis of which extends in a direction transverse to the direction of the pivotal axes of said actuating members, a travelling member carried by the threaded portion of said adjusting shaft, a collar pivotally connected to said traveling member for pivotal movement about an axis extending transversely to the axis of the adjusting shaft, a pair of strap members each connected at one end to a respective actuating member and at the other end to said collar, said strap members including resilient expansion means operatively positioned between the respective actuating member and said collar operatively connected to said strap members, said actuating members each having an arcuately shaped portion over which the strap may ride, said collar being operative to equalize the adjusting forces applied by said actuating members to said controllable member, and means operatively connected to said shaft for adjustably rotating the same.

4. A variable speed control and indicating device comprising a supporting structure, a pair of independently movable arms carried by said supporting structure and constructed for engagement with an adjustable element of a variable speed device, an adjusting screw supported by said structure for rotation relative thereto, means for restricting axial movement of said screw, a nut carried by said screw, a yoke pivotally mounted on said nut for pivotal movement about an axis extending normal to the screw axis, connecting means extending between said yoke and the respective movable arms whereby movement of said nut along said screw is transmitted to said arms, said connecting means including a pair of strap members each connected at one end to its respective independently movable arm, each of said strap members including resilient expansion means operatively positioned between the respective independently movable arm and said yolk operatively connected to the respective strap member of the connecting means, the connection of the strap members of said connecting means to said yoke being disposed at opposite sides of the pivotal axis of the connection between said nut and yoke whereby forces applied to said independently movable arms are equalized.

5. In a speed control and indicating device, the combination of a housing comprising two like sections, forming opposite sides of a pulley compartment, a variable pitch driving pulley and a variable pitch driven pulley disposed in said housing on parallel axes, means on said housing for connecting power means to either housing section for operative connection to said driving pulley, means on said housing for securing a supporting structure for driven means to either housing section for operative connection to said driven pulley, a thrust bearing assembly operatively related to the driving pulley for transmitting adjusting movement thereto, a pair of pivotal actuating members engageable with said thrust bearing assembly and operable upon pivotal movement to axially move said thrust bearing assembly and adjust said driving pulley, a supporting element, on which said actuating members are pivotally carried, connected to said housing, an externally threaded adjusting shaft rotatably carried by said supporting element, the axis of said adjusting shaft extending in a direction transverse to the direction of the pivotal axes of said actuating members, a nut carried by the threaded portions of said adjusting shaft, a collar pivotally connected to said nut for pivotal movement about an axis extending parallel to the axes of said pulleys, means on the adjusting shaft for limiting the travel of said nut therealong, a pair of strap members each connected at one end to a respective actuating member and at the other end to said collar, each of said strap members including resilient expansion means operatively positioned between the ends of each strap member, said actuating members each having an arcuately shaped portion over which the strap member may ride, means operatively connected to said shaft for adjustably rotating the same, a rotatable indicator element carried by said supporting element, means operatively connecting said indicator element with said shaft, said housing being adjustably connected to said power means and to said supporting structure for the driving means whereby the positions thereof relative to the housing and to each other may be varied, and said supporting element being adjustably connected to either section of said housing in operative relation to the driving pulley to be controlled by said adjustable shaft, whereby the position of said adjusting shaft relative to the housing and to said power means and said supporting structure for the driven means may be varied.

6. In a speed control and indicating device as defined in claim 5, wherein said rotatable indicator element is carried by a gear element rotatable about the shaft axis, a relatively stationary gear element carried by said supporting element, and a pair of rigidly connected pinions carried by said shaft and rotatable on an axis extending in the same direction as the shaft axes, and respectively engaged with and operatively connected to said gear elements.

7. In a speed control and indicating device as defined in claim 6, wherein said stationary gear element is adjustably carried by said supporting element for rotary adjustment about said shaft axis to provide for relative rotation of the rotatable indicator element with respect thereto.

8. In a speed control and indicating device as defined in claim 5, wherein said speed control and indicating device includes said variable pitch driving pulley of a driving unit, said variable pitch driven pulley of a driven unit and drive means operatively connecting said variable pitch driving pulley and variable pitch driven pulley, said housing enclosing said connecting drive means and operatively supporting said driving unit and said driven unit, said housing comprising two like sections and including a pair of spaced opposed walls connected at their edges by a peripheral wall forming a hollow structure in which said drive means is operatively positioned, said drive means including a driving belt, said housing being divided along said peripheral wall into said two like sections, each section including three outwardly extending lugs affixed to each of said sections whereby said sections may be reversed end to end and positioned in opposed relation, said sections of said housing also being separable to completely expose said driving belt for access thereto, the innermost section being secured at its opposite ends to the respective aforesaid units by mounting means engaged with the opposed wall of such section, said drive means including an adjustable variable speed drive, and means including said adjusting shaft and carried by said outermost section for operatively controlling the operation of said variable speed drive.

9. In a speed control and indicating device as defined in claim 8, wherein said peripheral wall of each section is provided with holes adapted to be aligned with threaded holes of said lugs for securing means for affixing said sections together in the assembled position of said sections.

10. In a speed control and indicating device as defined in claim 5, said adjusting shaft including an outwardly extending control member for effecting adjustment of one of said pulleys carried by said supporting element connected to said housing and said supporting element upon being adjustably connected to either section of said housing in operative relation to the pulley to be controlled by the control member permits the position of the adjusting control member and its adjusting shaft relative to the housing and to said power means and said supporting structure for the driven means to be varied.

11. In a speed control and indicating device as defined in claim 5, wherein said indicating device comprises dial means providing said rotatable indicator element for indicating rotation of said externally threaded adjusting shaft, said indicator device comprising an indicator housing and a supporting member for operatively mounting the indicator housing thereon, said adjusting shaft operatively mounted within the indicator housing and comprising a radially extending member formed with a bore through which the adjusting shaft extends, means for clamping the radially extending member to the adjusting shaft for rotation therewith, a relatively stationary gear member operatively mounted within the indicator housing and concentric with the adjusting shaft, said radially extending member comprising a short shaft journaled thereon, a small pinion and a large pinion operatively affixed to said short shaft on opposite sides of said radially extending member and rotatable about the axis of the short shaft extending in the same direction as the first-mentioned adjusting shaft, a pinion gear operatively affixed to the dial means and being smaller than the stationary gear member, both said pinion gear and said means journaled on the adjusting shaft, said small pinion operatively meshing with the stationary gear member and the large pinion operatively meshing with the pinion gear operatively affixed to the dial means, whereby as the adjusting shaft is rotated, the gear ratios are such that the dial means are rotated in a direction opposite to that of the adjusting shaft and at a very slow rate.

12. In a speed control and indicating device as defined in claim 11, wherein said dial means for indicating rotation of said adjusting shaft comprises a dial disc and card therefor, said pinion gear relatively movable and operatively affixed to said dial disc, both said movable pinion gear and said dial disc operatively mounted for rotation about said adjusting shaft, and said relatively stationary gear member being adjustably carried by said supporting member about said adjusting shaft axis to provide for relative rotation of the indicator device with respect thereto.

13. In a speed control and indicator device as defined in claim 12, wherein said relatively stationary gear member is axially movable relative to said supporting member, spring means operatively disposed therein between said radially extending member and said stationary gear member for urging the stationary gear member into engagement with said supporting member, and means for detachably interlocking said relatively stationary gear member to said supporting member constructed for disengagement therebetween when said stationary gear member is moved axially away from said supporting member.

14. In a speed control and indicator device as defined in claim 13, wherein said interlocking means comprises a pin carried by one of said members and a plurality of cooperable recesses in the other of said members.

15. In a speed control and indicating device, the combination of a housing comprising two like sections, forming opposite sides of a pulley compartment, a variable pitch driving pulley and a variable pitch driven pulley disposed in said housing on parallel axes, means on said housing for connecting power means to either housing section for operative connection to said driving pulley, means on said housing for securing a supporting structure for driven means to either housing section for operative connection to said driven pulley, a thrust bearing assembly operatively related to the driving pulley for transmitting adjusting movement thereto, a pair of pivotal actuating members engageable with said thrust bearing assembly and operable upon pivotal movement to axially move said thrust bearing assembly and adjust said driving pulley, a supporting element, on which said actuating members are pivotally carried, connected to said housing, an externally threaded adjusting shaft rotatably carried by said supporting element, the axis of said adjusting shaft extending in a direction transverse to the direction of the pivotal axes of said actuating members, a nut carried by the threaded portion of said adjusting shaft, a collar pivotally connected to said nut for pivotal movement about an axis extending transversely to the axis of the adjusting shaft, means on the latter for limiting the travel of said nut therealong, a pair of strap members each connected at one end to a respective actuating member and at the other end to said collar, said actuating members each having an arcuately shaped portion over which the strap may ride, means operatively connected to said shaft for adjustably rotating the same, said strap members being provided with resilient expansion means, a gear element rotatable about the adjusting shaft axis, a rotatable indicator element carried by said rotatable gear element, an adjustable relatively stationary gear element carried by said supporting element for rotary adjustment about said adjusting shaft axis to provide for relative rotation of the indicator with respect thereto when said relatively stationary gear element is axially moved relative to said supporting element, spring means operatively disposed in the latter between said shaft and said stationary gear element for urging the latter into engagement with said supporting element, means for detachably interlocking said relatively stationary gear element to said supporting element constructed for disengagement therebetween when said stationary gear element is moved axially away from said supporting element, and a pair of rigidly connected pinions connected by said shaft and rotatable on an axis extending in the same direction as the shaft axis, and engaged with and operatively connected to said gear elements.

16. In a speed control and indicating device as defined in claim 15, wherein said interlocking means comprises a pin carried by one of said elements and a plurality of cooperable recesses in the other of said elements.

References Cited in the file of this patent

UNITED STATES PATENTS

| | | |
|---|---|---|
| 732,977 | Wahle | July 7, 1903 |
| 1,817,216 | Uggla | Aug. 4, 1931 |
| 2,207,219 | Heyers | July 9, 1940 |
| 2,212,572 | McCarthy et al. | Aug. 27, 1940 |
| 2,259,567 | Johnson et al. | Oct. 21, 1941 |
| 2,398,235 | Luenberger | Apr. 9, 1946 |
| 2,436,583 | Lear | Feb. 24, 1948 |
| 2,474,726 | Source | June 28, 1949 |
| 2,585,829 | Perkins | Feb. 12, 1952 |
| 2,631,462 | Johnson et al. | Mar. 17, 1953 |
| 2,706,913 | Trossi | Apr. 26, 1955 |
| 2,751,788 | Forrest | June 26, 1956 |
| 2,753,834 | Bourguignon | July 10, 1956 |
| 2,830,473 | Brown | Apr. 15, 1958 |